United States Patent [19]

Shakib et al.

[11] Patent Number: 5,778,213
[45] Date of Patent: *Jul. 7, 1998

[54] MULTILINGUAL STORAGE AND RETRIEVAL

[75] Inventors: Darren A. Shakib; Max L. Benson, both of Redmond; Scott Norin, Newcastle, all of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 678,994

[22] Filed: Jul. 12, 1996

[51] Int. Cl.$^6$ .................................................. G06F 17/30
[52] U.S. Cl. .................. 395/500; 364/226.4; 364/222.9; 1/1
[58] Field of Search ..................... 395/500, 601, 395/751, 752, 757; 1/1; 364/226.4, 222.9

[56] References Cited

U.S. PATENT DOCUMENTS

| | | | |
|---|---|---|---|
| 4,130,882 | 12/1978 | Swanstrom et al. | 364/900 |
| 4,193,119 | 3/1980 | Arase et al. | 364/900 |
| 4,873,625 | 10/1989 | Archer et al. | 364/200 |
| 4,939,639 | 7/1990 | Lee et al. | 364/200 |
| 5,148,541 | 9/1992 | Lee et al. | 395/600 |
| 5,218,699 | 6/1993 | Brandle et al. | 395/650 |
| 5,247,676 | 9/1993 | Ozur et al. | 395/650 |
| 5,283,856 | 2/1994 | Gross et al. | 395/51 |
| 5,309,359 | 5/1994 | Katz | 364/419.19 |
| 5,337,233 | 8/1994 | Hofert et al. | 364/419.14 |
| 5,416,903 | 5/1995 | Malcolm | 395/155 |
| 5,442,782 | 8/1995 | Malatesta et al. | 395/600 |
| 5,467,472 | 11/1995 | Williams et al. | 395/600 |
| 5,469,354 | 11/1995 | Hatakeyama et al. | 364/419.19 |
| 5,473,691 | 12/1995 | Menezes et al. | 380/25 |
| 5,497,319 | 3/1996 | Chong et al. | 364/419.02 |
| 5,551,018 | 8/1996 | Hansen | 395/600 |
| 5,615,366 | 3/1997 | Hansen | 395/607 |
| 5,640,587 | 6/1997 | Davis et al. | 395/800 |
| 5,675,818 | 10/1997 | Kennedy | 395/758 |

OTHER PUBLICATIONS

"Forte showcases multilingual support", Andrea Pucky, Database Programming & Design, Oct. 1995, p. 76.
"Unicode", Mark Davis et al., 1990 IEEE, pp. 499–504.
Shirley, John and Rosenberry, Ward, "Microsoft RPC Programming Guide", O'Reilly & Associates, 1995.
Kramer, Matt, "Baranof's MailCheck 2.6 Delivers Improved Tools", PC Week, Sep. 11, 1995, Ziff–Davis Publishing Company 1995.
Frenkel, Gary, "cc:Mail View Keeps an Eye on Your Messaging System", Network Computing, Jun. 1, 1995, CMP Publications, Inc., 1995.

Primary Examiner—Kevin J. Teska
Assistant Examiner—A. S. Roberts
Attorney, Agent, or Firm—Workman, Nydegger & Seeley

[57] ABSTRACT

A single processor/storage device provides multilingual support for a computer system. Information is divided into two parts. The first part is initially stored in a first character set, e.g., the character set in which it was created. A tag, identifying the character set, is associated with the first part. The second part is stored in a universal character set. The first part is converted to another character set only when requested. Indices may be generated from the second part using specified language sorting rules.

12 Claims, 3 Drawing Sheets

MULTILINGUAL STORAGE AND RETRIEVAL

BACKGROUND OF THE INVENTION

The invention relates to storing and retrieving information in multiple character sets in a computer system.

Modern electronic communication technologies provide communication and information sharing among people from distant locations. The communication often takes place using applications, such as electronic messaging, across a local- or wide-area computer network. The information sharing often involves the transfer of database information across the network. Although such networks allow people from different regions to communicate and share information more easily than before, people continue to prefer communicating in their native languages. This preference to communicate in disparate native languages requires computer systems to operate in a multilingual environment.

Each language has at least one character set, or code page, that is required to display information. Each character set includes all of the characters used by the respective language (e.g., the letters of the English alphabet or the symbols of Kanji). However, more than one language may use the same character set. Consequently, each language also has language-specific rules for displaying information. The language-specific rules are used for sorting the information.

In some existing computer systems, each processor/storage device only supports a single character set. For example, a server in a client/server network stores and supports a database. The database is stored in a single character set. A client requesting information from the database may receive the information only in the single character set. Also, a sort of fields in the database may be created only in the single character set. If the client must work with the database in a different character set, the entire database must be transferred to a server capable of supporting the different character set, or the client must convert the requested information into the different character set.

In other existing computer systems, all of the information is stored in a universal character set. Using the client/server example, all information on the network is stored in a universal character set, e.g., Unicode. When a client requests information, it is converted from Unicode into the client-selected character set.

Unicode, and other universal character sets, use two bytes to represent each character. Many character sets that support specific languages use only one byte to represent each character. Therefore, storing all information in a universal character set may double the required storage space for the stored information. Also, character set conversions may be time consuming and processor intensive operations.

SUMMARY OF THE INVENTION

The invention departs from the known schemes that may be used in a computer system to support multilingual communication. The invention supports multiple languages on a single processor/storage device, e.g., a server.

Information is divided into two parts. A first part (e.g., a first table), which would typically include the bulk of the information found in the record, is stored in a selected character set. A second part (e.g., another table), which would typically contain the fields used to create sorted views or lists of records, is stored in a universal character set, e.g., Unicode.

In one embodiment, the selected character set is the character set in which the record was created, i.e., its native character set. A tag identifies the character set and is associated with the first part of information.

Requests for information are generated by users on the computer system. For example, a client establishes a session with a server. The client selects information, e.g., a first set of fields of a database record, and identifies only the desired character set (i.e., code page) and the language for the requested information. The server determines whether the information presently is stored in the character set selected by the user. If so, the information is sent to the client. If not, the server converts the information to the user-specified character set, then sends the converted information to the client.

Also, the client may want to sort the second parts, e.g., one or more fields of a second set of fields in the database records, using an index. The client sends the sort request to the server, along with the desired character set and language. The server determines whether the index already exists in the user-selected language. If so, the server uses that index. If not, the server creates a new index.

Native character set storage results in several advantages over other storage formats, such as universal code storage. First, information is not converted from one character set into another unless, and until, the information is requested in a character set other than the stored character set. As a result, the server is not burdened with unnecessary conversions and stored information.

Also, storing information in a character set associated with a user's native language typically requires less storage space than storing the same information in a universal character set. Also, the most common request for the information may be in its native character set. Therefore, no conversion is required and errors created by character set conversions are prevented.

Additionally, the multilingual support is provided to the users transparently. The user only needs to designate a desired character set and language. Further, indices are built efficiently and as needed. Finally, all of the multilingual support may be provided at the server, reducing the burden on the client and network administrator.

The multilingual support technique may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

DESCRIPTION OF THE PREFERRED EMBODIMENTS

Figure 1:
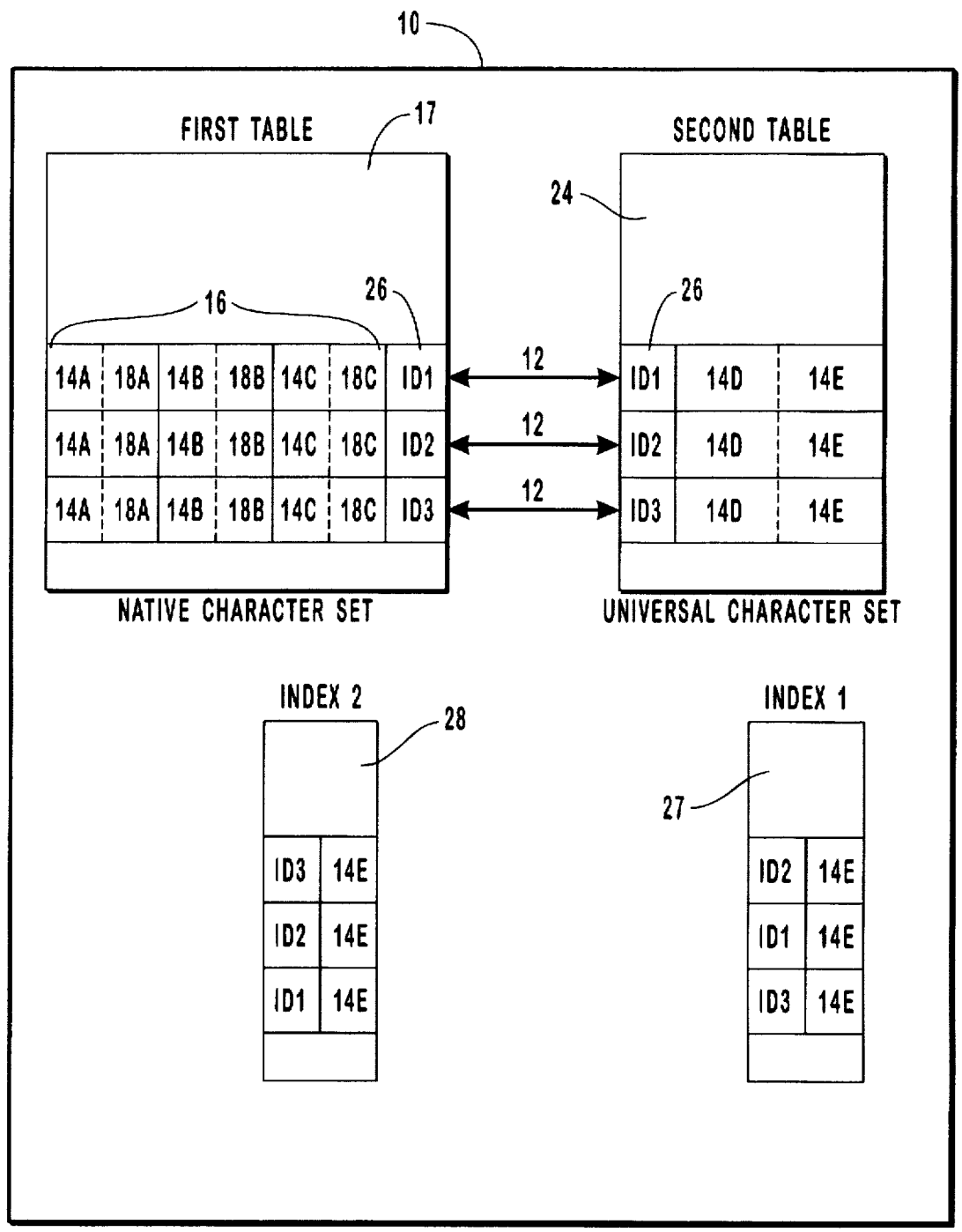
FIG. 1 is a block diagram of a multilingual database configuration.

Multilingual support may be implemented in a client/server network having one or more servers. Information may be stored on a server in a database 10, as shown in FIG. 1. The database includes multiple records (or rows) 12, and each record includes multiple fields (or columns) 14. A first set of preselected fields 16 of each database record are stored in a first location 17, e.g., a first table. The first set of fields 16 typically contain the bulk of the database record. The first set of fields (e.g., fields 14A, 14B, 14C) are stored in a first character set, e.g., the character set in which they were created.

Associated with each field 14 of first set 16 is a tag 18 that identifies the character set (i.e., code page) in which the field is stored. The tag may be any code for identifying the character set. In another embodiment, a tag is associated with each first set of fields.

The character set indicates to the computer system the proper way to display each character. For example, the ASCII character set, which contains representations for the punctuation marks and upper- and lower-case letters for the English language, may serve as a character set for the English language. A first set of fields 16 stored in ASCII would have associated tags 18 which identify the ASCII character set.

The remaining or second set of fields 22 of each database record is stored in a second location, e.g., second table 24. The two sets of fields 16, 22 that form each record 12 are associated by an identification code 26. The second set 22 may include one or more database fields (e.g., fields 14D, 14E). The second set 22 is used for viewing and sorting the database records 12.

Each second set 22 may be stored in a universal code, e.g., Unicode. A second set is typically smaller than its associated first set and, consequently, the second set stored in Unicode require less storage space than the first set stored in Unicode. Furthermore, storing the second sets in Unicode permits faster sorting and conversion of the references (described below).

The second sets, stored in second table 24, may be sorted according to specified language rules to form an index of the database records. A sort may be based on a single field or multiple fields of the second sets. For example, a first index 27 is created from a sort of field 14E found in the second set 22 of each data record 12, as shown in FIG. 1. The order of the fields 14E is determined by the language-specific rules designated by the user. The same sort of field 14E according to the language-specific rules of a different language may result in a different order of fields 14E, as shown in second index 28.

Indices can be created as needed, e.g., upon user demand. Therefore, the server is not required to generate multiple indices in various languages, all of which may or may not be needed. Further, minimum storage space is consumed by storing only the indices requested by users. In one embodiment, the indices are stored in a universal character set, e.g., Unicode.

Additionally, character set conversion tables are stored on the server to provide character set conversion.

Figure 2:
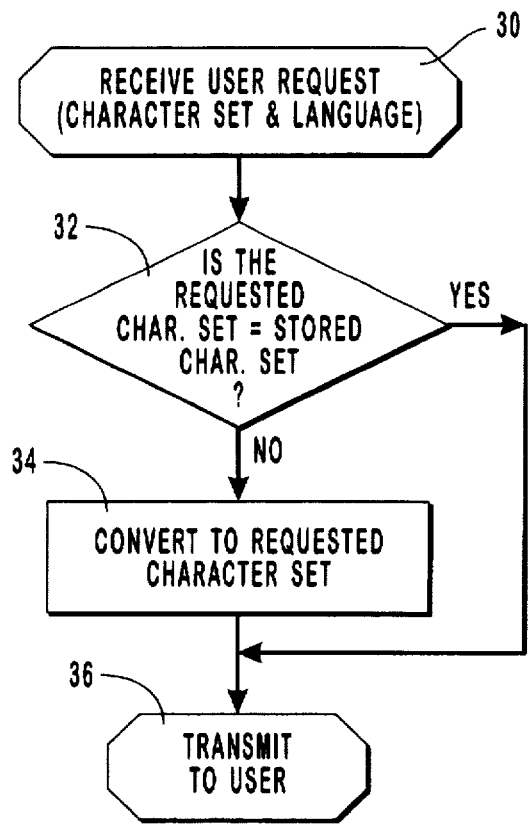
FIG. 2 is a flow diagram of the conversion of requested information from one form on a network server to another form on a network client.

FIG. 2 shows the steps followed when a user (e.g., client) requests the first set 16 of a database record 12. When making a request, at step 30, the user specifies the character set and language-specific rules for the data file to be transmitted back to the user. In one embodiment, the character set and language are preselected by the user and automatically presented for each request.

At step 32, the server determines whether the selected first set is already stored in the user-specified character set (i.e., the user requests the first set in its native character set or the first set has already been converted to the user-specified character set). If so, the server simply transmits the first set to the user at step 36. If the selected first set is not stored in the user-specified character set, the first set is converted to the user-specified character set.

The server uses the stored character set conversion tables or performs the character set conversion according to other known conversion methods. In one embodiment, the selected first set is initially converted into Unicode, and then converted into the user-specified character set. The selected first set is then transmitted to the user at step 36.

Figure 3:
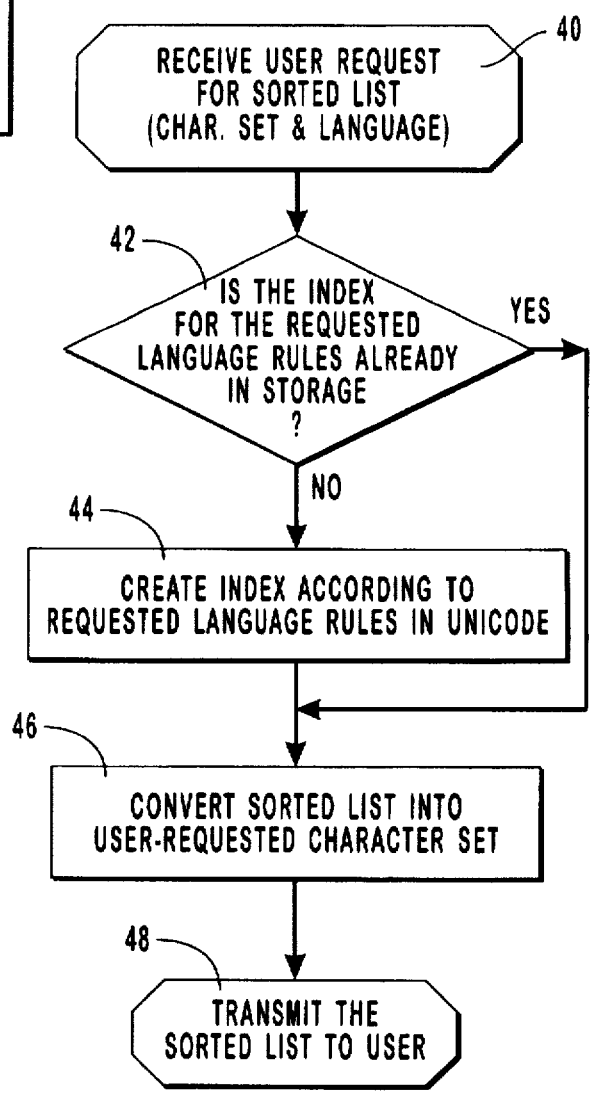
FIG. 3 is a flow diagram of the formation of index information on a network server and its conversion for use on a network client.

FIG. 3 shows the steps involved when a user requests a sorted list from the second sets 22 stored in second table 24. The user accompanies the request for a sorted list with a character set and language for the requested sorted list at step 40. At step 42, it is determined whether the index for creating the list according to the rules of the user-requested language has previously been created. At step 46, the list sorted according to the index is converted to the user-requested character set. Then, the sorted list is transmitted to the user at step 48.

To conserve server storage space, previously created indices may eventually be deleted from the server using any common caching technique. For example, indices that have not been accessed for a predetermined period may be deleted. In another technique, indices that are difficult to construct may be stored for a longer period than indices that are shorter or easier to construct.

If the index is not already stored, the server creates the index in Unicode for the selected field(s) 14 according to the specified language rules at step 44. Steps 46 and 48, as described above, are then performed. The server thus builds new indices dynamically when requested by a user. Server performance during dynamic index construction is maximized because the server stores the references in Unicode.

Referring more specifically to the sort process, the server sorts one or more fields of the second sets according to user-specified language rules. It is important that the sort be presented to the user in the user-specified language, i.e., according to the rules of the user-specified language. Different languages have different rules for sorting characters such as accents, "foreign" characters, and character combinations.

For example, the English language and Swedish language may use the same code page. However, the two languages may have distinct rules for sorting information alphabetically. Sorting routines may be designed for such rules.

An English language sorting routine may look at the first character of a word and sort it alphabetically. If any first characters match, the routine may compare the second character of the matching words, and so on. An English routine may have trouble, however, with "non-English" characters. For example, the English routine may not recognize the character "ä" even if the character set being used supports the display of the character. The English routine may thus improperly push the character to the bottom of a sorted index. A routine following English rules may thus produce the following sorted index:

Kathy
Källen
Kurt

However, a routine following Swedish rules may produce a different sort index:

Källen
Kathy
Kurt

The different sort order, depending on the language rules, can be critical when an index contains hundreds or thousands of references. The process described above thus permits a user to receive an index sorted according to the user-specified language rules.

Figure 4:
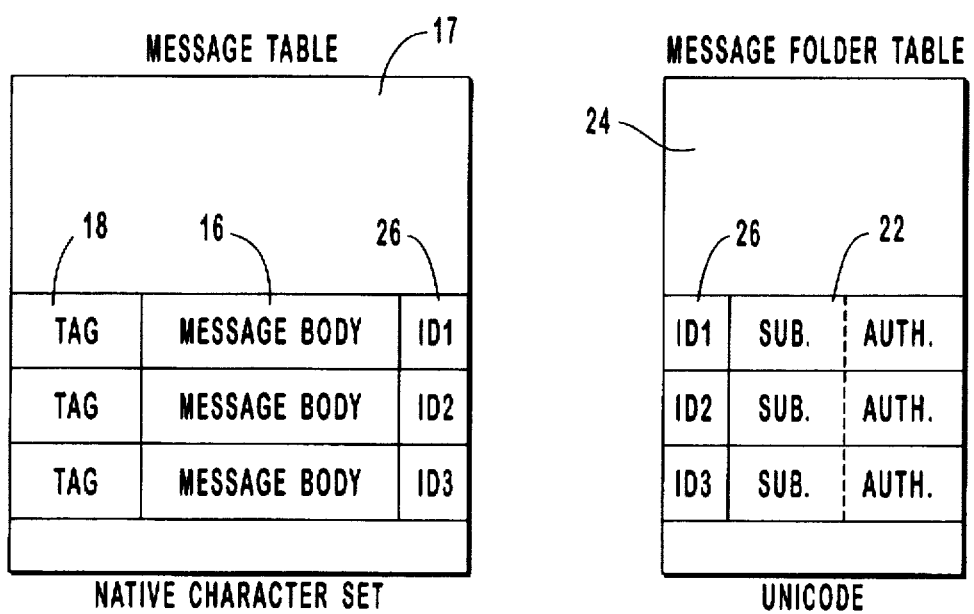
FIG. 4 is a block diagram of a multilingual electronic mail configuration.

Different applications of the system described above should be readily apparent to one skilled in the art. In such embodiment, shown in FIG. 4, the first set 16 includes the main body of an electronic mail message. The tag 18 refers to the character set in which the sender created the message. The second set 22 consists of identifying header information for each message, e.g., subject, author, addressee, date/time created. The main body portion 16 is stored in message table 17. The message header information 22 is stored in a message folder table 24 (e.g., a public folder). When a user opens a message folder, the header information, which is stored in Unicode, is sorted according to the language-specific rules requested by the user. When a user selects a message and specifies a character set different from the stored character set, the message is converted to the user's selected character set.

In another embodiment, a database includes multiple records, and each record includes multiple fields. The database is stored in a single location or table. A first set of fields are stored in a first character set, e.g., the native character set. A second set of fields are stored in a second character set, e.g., a universal character set. As described in the embodiments above, a tag is associated with the first set of fields, and the second set of fields is used for generating indices and viewing records. Other embodiments are within the scope of the following claims.

We claim:

1. In a networked system comprising a plurality of client stations interconnected to at least one server, and wherein database records are received at the server from the client stations in a plurality of written languages each using a designated character set for a given language, a method for generating at the server a database which permits (a) storing of multilingual data in the database using a universal character set but without having to translate the entirety of each received data record into the universal character set, and which also permits (b) returning, in response to a client request, data in a requested one of said plurality of written languages using the designated character set for that language, the method comprising the steps of:

receiving from one of said client stations a database record comprising a plurality of data fields containing data in a native character set for a given language;

separating said plurality of data fields into a first set and a second set, said first set including only those data fields from which the database record is sorted, and said second set containing the remaining data fields of the database record;

storing said data fields of said second set into the database such that the data of said second set is maintained in said native character set;

translating said data fields of said first set from said native character set into a universal character set and then storing said data fields of said first set into the database;

receiving at said server a request from a client station for an index of at least a portion of the database sorted according to user-specified language rules; and sorting at least a portion of said first set of data fields to generate said requested index and returning said requested index to the client station from which the request was received in said user-specified language.

2. The method of claim 1, further comprising the steps of:

receiving from one of said client stations a request for at least one data field in said second set to be returned in a character set other than said native character set in which it was stored, and converting the requested at least one data field from the native character set in which it was stored to the requested character set.

3. The method of claim 1, further comprising the steps of:

prior to said sorting step, determining whether the desired index exists for said user-specified language rules; and if the desired index does not already exist then creating a new index for said user-specified language rules by performing at least said sorting step.

4. The method of claim 1, further comprising the steps of;

maintaining created indices for future use; and discarding individual previously created indices upon occurrence of a predetermined condition.

5. The method of claim 4, wherein the predetermined condition is a predetermined period of time.

6. The method of claim 1, wherein a tag is associated with each field of said first set that identifies said native character set of said field.

7. The method of claim 1, wherein said universal character set comprises Unicode.

8. The method of claim 1, wherein said data fields of said database record comprise data fields of an electronic mail message.

9. The method of claim 1, wherein said first set is stored in a first table, and said second set is stored in a second table.

10. The method of claim 9, wherein said data fields of said database record comprise data fields of an electronic mail message comprising at least a message body data field and at least one header data field, and wherein said first table is a message table comprising the message body data field, and said second table is a message folder table comprising said at least one header data field.

11. A database system for storing and retrieving multilingual data comprising:

a plurality of client stations;

at least one server networked together with said plurality of client stations, said at least one server comprising program means for generating at the server a database using a method comprising the steps of:

receiving from one of said client stations a database record comprising a plurality of data fields containing data in a native character set for a given language;

separating said plurality of data fields into a first set and a second set, said first set including only those data fields from which the database record is sorted, and said second set containing the remaining data fields of the database record;

storing said data fields of said second set into the database such that the data of said second set is maintained in said native character set;

translating said data fields of said first set from said native character set into a universal character set and then storing said data fields of said first set into the database;

receiving at said server a request from a client station for an index of at least a portion of the database sorted according to user-specified language rules; and sorting at least a portion of said first set of data fields to generate said requested index and returning said requested index to the client station from which the request was received in said user-specified language.

12. In a networked system comprising a plurality of client stations interconnected to at least one server, as an article of manufacture, a computer program product comprising:

a computer readable medium for storing computer program code means for generating a database; and wherein said computer program code means comprises:

means for receiving from one of said client stations a database record comprising a plurality of data fields containing data in a native character set for a given language;

means for separating said plurality of data fields into a first set and a second set, said first set including only those data fields from which the database record is sorted, and said second set containing the remaining data fields of the database record;

means for storing said data fields of said second set into the database such that the data of said second set is maintained in said native character set;

means for translating said data fields of said first set from said native character set into a universal character set and then storing said data fields of said first set into the database;

means for receiving at said server a request from a client station for an index of at least a portion of the database sorted according to user-specified language rules; and means for sorting at least a portion of said first set of data fields to generate said requested index and returning said requested index to the client station from which the request was received in said user-specified language.

* * * * *